Oct. 6, 1970 H. A. FERRIER, JR 3,532,994

ANTICOINCIDENT CIRCUIT

Filed Aug. 8, 1967 2 Sheets-Sheet 1

INVENTOR.
HERMAN A. FERRIER, JR

BY Thomas Schatzel
ATTORNEY

INVENTOR.
HERMAN A. FERRIER, JR.
BY Thomas E. Schatzel
ATTORNEY

United States Patent Office 3,532,994

Patented Oct. 6, 1970

3,532,994

ANTICOINCIDENT CIRCUIT

Herman A. Ferrier, Jr., San Jose, Calif., assignor to Ampex Corporation, Redwood City, Calif., a corporation of California Filed Aug. 8, 1967, Ser. No. 659,139
Int. Cl. H03k *5/20*
U.S. Cl. 328—109 1 Claim

ABSTRACT OF THE DISCLOSURE

An anticoincident circuit for use in association with a digital phase comparator, the circuit including receiving means for receiving two separate pulse trains of which a phase comparison is desired, means for passing said pulse trains to the digital comparator when the timing relationship between the pulses exceed a predetermined time value, and means blocking said pulse trains from the digital comparator when the timing relationship between the pulses is less than the predetermined value whereby the phase comparator does not receive coincident pulses of said pulse trains.

The invention herein described was made in the course of a contract with the Department of United States Navy.

BACKGROUND OF THE PRIOR ART

A phase sensitive digital comparator may be viewed as a backward-forward counter which counts forward with pulses received in the forward line and counts backward with pulses received in the reverse line. Such digital comparators have found wide use in servomechanisms, e.g., magnetic tape recorder/reproducers. The phase comparator may receive and compare the difference of a reference pulse train and a feedback pulse train respectively representative of the desired and actual conditions of the servomechanism. In prior art digital phase comparator systems, when the two pulse trains are nearly in phase (coincident), a condition can arise in which the pulses arrive at the forward count terminal simultaneously with the pulses arriving at the backward count terminal. Theoretically, if the phase comparator is capable of counting up one for the forward count and backward one for the reverse count, the comparator would not lose its count and would operate properly. However, it has been observed that available prior art digital phase comparators (counters) count one pulse and not the other when the in phase or coincident condition arises. Consequently, the comparator provides an incorrect count. If the servomechanism is in the form of a motor the incorrect signal may be a full forward or reverse signal. This frequently results in speed overshoot and depending upon the inertia of the system and the resolution of the comparator, the servo system tends to go into a limit cycle oscillation and does not enter synchronization. This type of operation has been observed on instrumentation type recorders having high tachometer frequencies, for example above 25 kHz.

A prior art method of circumventing this problem for servomechanisms of magnetic tape recorder/reproducers has been to incorporate, at high tape speeds, digital dividers for both the reference and the feedback signals. This tends to maintain comparator input frequencies below the critical frequency. However, this approach imposes other limitations. It necessitates a change in the equalizer of the servo system and considerably increases the complexity of the system. Also, the lower carrier frequency tends to limit the servo bandwidth.

SUMMARY OF THE INVENTION

The anticoincident circuitry of the present invention overcomes the above mentioned servo synchronization problem without imposing the limitations of the prior art. The anticoincident circuitry precedes the digital phase comparator and receives the reference and feedback pulse trains. The circuitry provides an individual path for each train and an alternative path common to both trains. The individual paths for each train delays the received pulse train and passes it to the logic network, e.g., a normally transmissive AND gate associated with a respective input to the comparator. The alternatvie common path receives both pulse trains and provides distinguishable output signals dependent upon the time relationship of the pulse trains. For example, when the phase relationship between the trains is less than a preset value, a control signal in the form of a stretched-out pulse is generated and delivered to the logic network at the input of the comparator and when the phase relationship exceeds the preset value, the control signal is zero. The pulse control signal in turn biases the input logic network to a non-transmissive condition thus blocking passage of the delayed trains to the comparator. Thus, the anticoincident network prevents both pulse trains from arriving at the phase comparator in the event the time relationship is close enough that the comparator would have difficulty in resolving them. If the digital phase comparator (counter) is capable of counting up and down for pulses which are separated by a time $t_1$ seconds or more the anticoincident circuit may be preset to eliminate all pulses which are closer in time than $t_1$ seconds by having the control signal generated when such time relationship exists. In fact the circuit may be preset to eliminate all pulses which are closer in time than $t_2$ where $t_2$ exceeds $t_1$. By so doing there is provided a safety margin for counting operations. So long as the pulses are $t_2$ or further apart, the pulses, though delayed by $t_2$ or more, are passed through the anticoincident circuitry to the digital phase comparator (counter). If the pulse trains are less than $t_2$ seconds apart the signals are blocked from reaching the digital comparator.

An illustrated embodiment of the present anti-coincident circuit and which will be described hereinafter in detail, may be viewed as adapted to receive reference and feedback pulse trains having pulses of a predetermined width. The anticoincident circuit network comprises a pair of AND gates each tied to the input terminals of the digital phase comparator. One AND gate controls passage of the reference pulses to the digital phase comparator and the other controls passage of the feedback pulses. The input of the reference AND gate is tied to a first delay network which has a delay time in the order of $t_1$ or more seconds. The input of this first delay network receives the reference pulse train. Tied to the other input terminal of the reference AND gate is the series combination of a third AND gate and a pulse stretching network providing a control signal of a duration substantially exceeding $t_1$. This latter network is such that the third AND gate switches state when the input reference and feedback pulses overlap. When the third AND gate thus responds to overlapping pulses, a control signal in the form of a stretched out pulse is supplied to the reference AND gate so as to bias it non-transmissive and to block passage of the delayed pulse train received at the other terminal. The feedback AND gate has one terminal tied to a second delay network similar to the delay network tied to the first terminal of the reference AND gate. The second delay network receives the feedback pulse train. The second input terminal of the feedback AND gate is tied to the second input terminal of the reference AND gate such that when the reference AND gate is biased non-transmissive the feedback AND gate is also biased non-transmissive. Accordingly, when the time duration between the reference and feedback pulses exceeds $t_1$, both the reference AND and feedback AND gates are transmissive and allow passage of the reference and feedback pulse trains to the digital phase comparator. However, when the duration between the reference and feedback pulses is less than $t_1$ the control signal biases the reference AND and feedback AND gates non-transmissive thus blocking passage of the trains.

BRIEF DECRIPTION OF THE DRAWINGS

DESCRIPTION OF PREFERRED EMBODIMENTS

Figure 1:
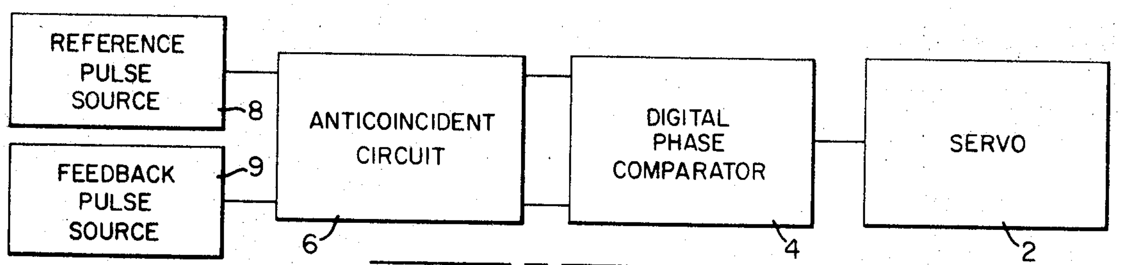
FIG. 1 is a block diagram illustrating an association between the anticoincident circuit of the present invention and a servomechanism system incorporating a digital phase comparator.

FIG. 1 is a block diagram of a network for controlling an electro-mechanical device of a servomechanism system. The servomechanism system is designated in part by the block 2. The electro-mechanical device may take the form of an electrical motor used to drive the capstan of a magnetic tape recorder/reproducer. In this event the speed of the motor is controlled by controlling the excitation of the motor. In FIG. 1 the excitation to the servo 2 is provided through a digital phase comparator 4 which receives at its inputs a reference pulse train and a feedback pulse train indicative of the actual condition of the servo 2. The previously mentioned pulse trains are passed through an anticoincident circuit 6 which incorporates the teachings of the present invention. The reference pulses are generated within a source 8, e.g., an oscillator generating a square wave subsequently converted to a pulse train, and received at the input of the anticoincident circuit 6. The feedback pulses are generated by a source 9, e.g., a tachometer generating a square-wave responsive to the condition of a motor, wherein the square-wave is subsequently converted to a pulse train. Briefly, the anticoincident circuit 6 passes the respective reference and feedback pulse trains to the digital phase comparator 4 when the time relationship between the respective trains exceeds a certain preset value. If the time relationship is less than the preset value, the anticoincident circuit 6 block the respective trains from being applied to the digital phase comparator 4. Accordingly, the digital phase comparator 4 is not subjected to two pulse trains which are coincident, thereby avoiding the erratic operation of the servo which has been found to otherwise exist when the pulse coincident conditions exists.

Figure 2:
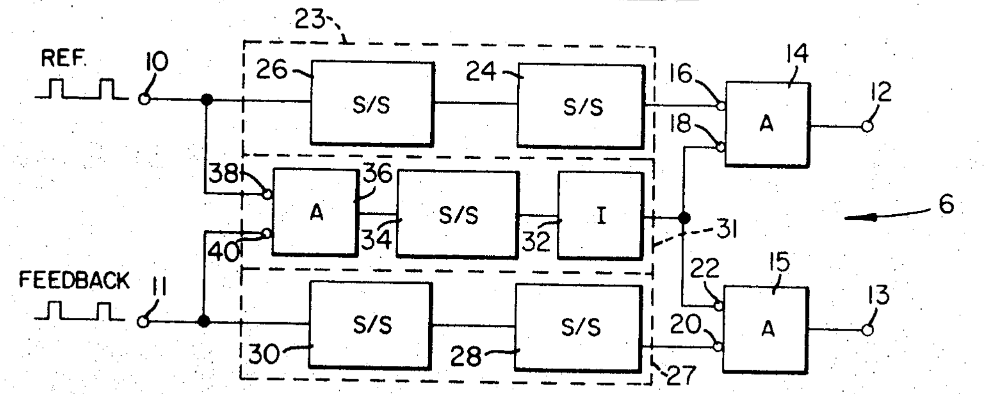
FIG. 2 is a block circuit diagram of the anticoincident circuit network of FIG. 1 and illustrating the network in further detail.

FIG. 2 is a more detailed block diagram of the anticoincident network 6. The anticoincident circuit has a pair of input terminals 10 and 11 and a pair of output terminals 12 and 13. The output terminals 12 and 13 are respectively common to the outputs of first and second output AND logic gates 14 and 15, respectively. The output terminals 12 and 13 may also be viewed as the input terminals to the digital phase comparator 4 (FIG. 1). The AND gate 14 is adapted for passing or blocking the reference pulse train to the digital phase comparator 4 while the AND gate 15 passes or blocks the feedback pulse train to the digital phase comparator 4. The AND gate 14 has a pair of input terminals 16 and 18 and the AND gate 15 carries a pair of input terminals 20 and 22. The input terminal 16 of the AND gate 14 extends to a delay network illustrated within a broken-line block 23. The delay network 23 passes pulses representative of reference pulse train and includes a pair of single-shot multivibrator circuits 24 and 26 connected in series. The input of the single-shot 26 is common to the input terminal 10 and adapted to receive the reference pulse train. The input terminal 20 of the AND gate 15 is tied to a second delay network illustrated within a broken-line block 27. The delay network 27, as illustrated, is similar to the delay network 23 and includes a pair of single-shot multivibrator networks 28 and 30 connected in series. The delay network 27 passes pulses representative of the feedback pulse train. The input of the single-shot multivibrator 30 is common to the input terminal 11 and is adapted to receive the feedback pulse train. Preferably the time constant of the delay networks 23 and 27 are substantially equivalent such that the output pulses therefrom are representative of the phase relationship of the reference and feedback sources.

The input terminal 18 of the AND gate 14 is common to the input terminal 22 of the AND gate 15. The terminals 18 and 22 are also common to the output of a logic network illustrated within a broken line block 31 where they join an inverter network 32. The inverter network 32 is tied in series with a single-shot multivibrator 34. The single-shot 34 is tied to an AND gate 36. The AND gate 36 has a pair of input terminals 38 and 40, respectively common to the input terminals 10 and 11.

The theory of operation of the network of FIG. 2 is believed to be as hereinafter set forth. First assume that the associated digital phase comparator 4, joined to the output terminals 12 and 13, has a resolution of $t_1$ seconds and is capable of carrying forward and backward pulses which are separated by a time $t_1$, e.g., 100 nsec. In this instance the anticoincident circuitry 6 could be preset such that it eliminates or blocks the passage of all pulses when the phase relationship between the pulses of the respective trains is closer than a period $t_2$ where $t_2$ equals or exeeds $t_1$. By selecting $t_2$ to exceed $t_1$, it provides a safety margin for counter operations. For example if $t_1$ is 100 nsec., $t_2$ may be in the order of 200 nsec. To realize a setting of $t_2$, the width of the input pulses is adjusted to 200 nsec. and then received by the delay networks 23, 27 and by the AND gate 36. The time constant of the single shots 24, 26, 28 and 30 are selected to properly delay the pulse train signals to the terminals 16 and 20 of the AND gates 14 and 15. Since, in the example, the pulse width is 200 nsec., the delay networks 23 and 27 should preferably delay the respective pulse trains by 200 nsec. At the same time, the input terminals 18 and 22 may carry the proper normal potential to bias the AND gates 14 and 15 to normally transmit pulses received at inputs 16 and 20 respectively. The AND gate 36, conducts or assumes a transmissive condition when the reference and feedback pulses overlap. When the gate 36 conducts, a control signal in the form of a stretched out pulse is generated at the output of the inverter 32. The control signal alters the bias of the AND gates 14 and 15 to block the passage of pulses therethrough. The associated time constant of the single-shot multivibrator 34 and inverter 32 may be such that once the AND gate 36 is switched to a conductive condition, an output signal is extended or stretched for a period exceeding $t_2$. Thus, once the time relationship between pulses is less than $t_2$ and overlap, the AND gates 14 and 15 are biased to and block passage of the pulse trains to the digital phase comparator 4. It may be noted at this point that the previously mentioned safety margin of $t_2$ provides its key function in that the counter is capable of resolving a time $t_1$ which is less than $t_2$. Assuming $t_2$ is 200 nsec. and the resolution of the phase comparator is 100 nsec, at around a 200 nsec. pulse separation the AND gate 36 is just beginning to conduct. It is unimportant whether or not the single-shot 34 is fired precisely at 200 nsec. If it fires, a control signal is established and both pulse trains blocked. If it does not fire, both pulse trains pass through the gates 14 and 15. However, since the resolution of the phase comparator 4 is 100 nsec. the comparator will be capable of handling the approximately 200 nsec. separated pulses.

It may be further noted that it is preferable to include a plurality of single shots if single shots are used in the delay networks 23 and 27. The plurality of single shots shifts the leading edge of the associated pulse. With only one single shot in each delay network it is forseeable that the leading edge of the delay and control pulses may coinside at the AND gates 14 and 15.

Figure 3:
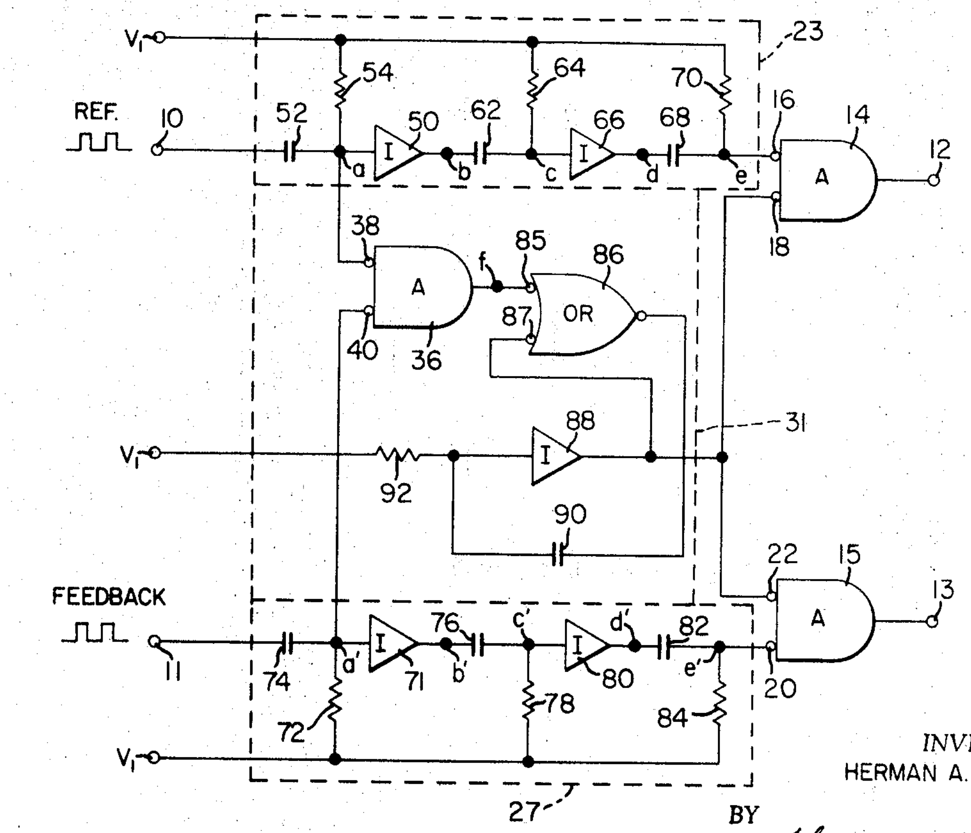
FIG. 3 is a circuit diagram illustrating implementation of the anticoincident network of FIGS. 1 and 2 in micrologic.

FIG. 3 illustrates the anticoincident circuit network 6 utilizing micrologic. For illustrative purposes the inputs are shown respectively as a square wave reference source and square wave feedback source. These square waves are subsequently converted to pulses of desired width. FIG. 3 incorporates the same reference numerals, where applicable, as that of FIG. 2. The AND gates 14 and 15 are similar as is the AND gate 36. However, the delay networks 23 and 27 are illustrated in more detail. The delay networks 23 and 27 are each similar in design and include single-shot multivibrators of the form normally known as half single-shots. The circuitry of the delay network 23 includes a half single-shot multivibrator incorporating a transistor inverter 50. The input of the inverter 50 is tied to the junction of a capacitor 52 and a resistance 54, which values are preselected according to the desired width of the pulses to be applied to the AND gate 36. The other side of the capacitor 52 is common to the input terminal 10 and receives the square-wave reference signal. The output of the inverter 50 is tied to a capacitor 62 which is common to the junction of resistor 64 and a second transistor inverter 66. The output of the inverter 66 is common with a capacitor 68 which capacitor is also common to the junction of a resistor 70 and the input terminal 16 of the AND gate 14. The resistors 54, 64 and 70 are all tied to a supply source designated $V_1$.

The delay network 27 is analogous to the network 23. It includes a transistor inverter 71, the input of which is tied to a junction of a resistor 72 and a capacitor 74, which values are preselected such that the resulting pulses in response to feedback square-waveform are of the same width as the developed reference pulses. The capacitor 74 extends to the input terminal 11 and receives the square-wave feedback signal. The output of the inverter 71 is common to a capacitor 76 which capacitor extends to the junction of a resistor 78 and the input of a second transistor inverter 80. The output of the inverter 80 is tied to a capacitor 82 which capacitor extends to the junction of a resistance 84 and the input terminal 20 of the AND gate 15. The resistors 72, 78 and 84 also join the supply source $V_1$.

Completing the nextwork of the anticoincident circuit in FIG. 3, it may be noted that the input terminals 38 and 40 of the AND gate 36 respectively join the input of the inverters 50 and 71. The output of the AND gate 36 is tied to one input terminal 85 of an OR gate 86. A second input terminal 87 of the OR gate 86 extends to the output of an inverter 88. The output of the OR gate 86 extends through a capacitance 90 to the input of the inverter 88. The input of the inverter 88 is also tied to a resistance 92 which extends to the supply source $V_1$. The output of the inverter 88 extends to a common junction of the input terminal 18 of the AND gate 14 and the input terminal 22 of the AND gate 15.

The theory of operation of the circuitry of FIG. 3 is believed to be as hereinafter discussed. In discussing the theory, reference will be made to FIG. 4 which illustrates the pulse shapes at various designated points of the circuit and under various conditions. The circuitry of FIG. 3 is designed to accommodate square-wave reference and feedback signals. The resistance capacitance time constant of the resistor 54 and capacitor 52 determine that the pulse width at *a* will be equivalent to $t_2$ in response to the reference square-wave. The values of the resistor 72 and capacitor 74 are likewise selected to provide a pulse at *a'* of width $t_2$ in response to the feedback square wave. A requirement of a half single-shot multivibrator is that the input pulse be longer than the output pulse. Viewing the arrangement of FIG. 3, first consider operation when the reference and feedback pulse trains are approximately 180° out of phase with respect to each other, which condition exists when the servomechanism is in synchronization. The square-wave reference signal is received at the input terminal 10 and a pulse signal having a negative going edge appears at the junction *a* of the capacitor 52 and inverter 50 corresponding to the trailing edge of the square-wave. The transistor inverter 50 is normally saturated by the current through the resistor 54 which is tied to $V_1$. The signal at *a* turns off the transistor inverter 50. However, the capacitor 52 simultaneously charges through the resistance 54 thus providing a wave-form at *a* similar to that designated in FIG. 4. When the pulse *a* decays to a preselected level, the inverter is again turned on providing a substantially rectangular pulse at the junction *b* which is of similar width to that at *a*. The combination of the capacitor 62 and the resistor 64 converts the trailing edge of the pulse at *b* to a negative going pulse at the junction *c*. The pulse *c* is thus delayed in relationship to the pulse *b*. The inverter 66 is initiated by the negative going edge of the pulse *c* similar to the previously discussed mode of the inverter 50. The output of the inverter 66 is in the form of a positive rectangular pulse *d*. It may be noted that the pulse *d* is substantially delayed in relationship to the pulse *b* and is also narrower. The trailing edge of pulse *d* is converted to a negative pulse at the junction *e*. The combination of the capacitor 68, resistor 70 and the input 16 of the AND gate 14 form another half single-shot multivibrator such that the output at the output terminal 12 of gate 14 is then in the form of a positive delayed pulse assuming the other input 18 is in a condition which enables gate 14 to pass pulses to output 12. Thus, the delay network 23 converts the reference train in the form of a square-wave reference signal to a train of delayed pulses responsive to the negative going edges of the square wave. Accordingly, by proper selection of the values of the resistors and capacitors the desired delay may be realized. At the same time, the delay network 27 receives the square-wave feedback pulses and generates similar pulses *a'*, *b'*, *c'*, *d'* and *e'* at corresponding stages in the network. Accordingly, the pulse at input 20 of AND gate 15 is shown by the waveform *e'*. However, since the feedback train is approximately 180° out of phase with respect to the reference train when synchronization is achieved the time spacing between pulses *a* and *a'* is greater than $t_2$. Thus, the *a* and *a'* pulses at the respective input terminals of AND gate 36 have no effect on the output thereof and the inputs 18 and 22 are maintained at their normal bias condition enabling gates 14 and 15 to pass the reference and feedback pulse trains to comparator 4.

Figure 4:
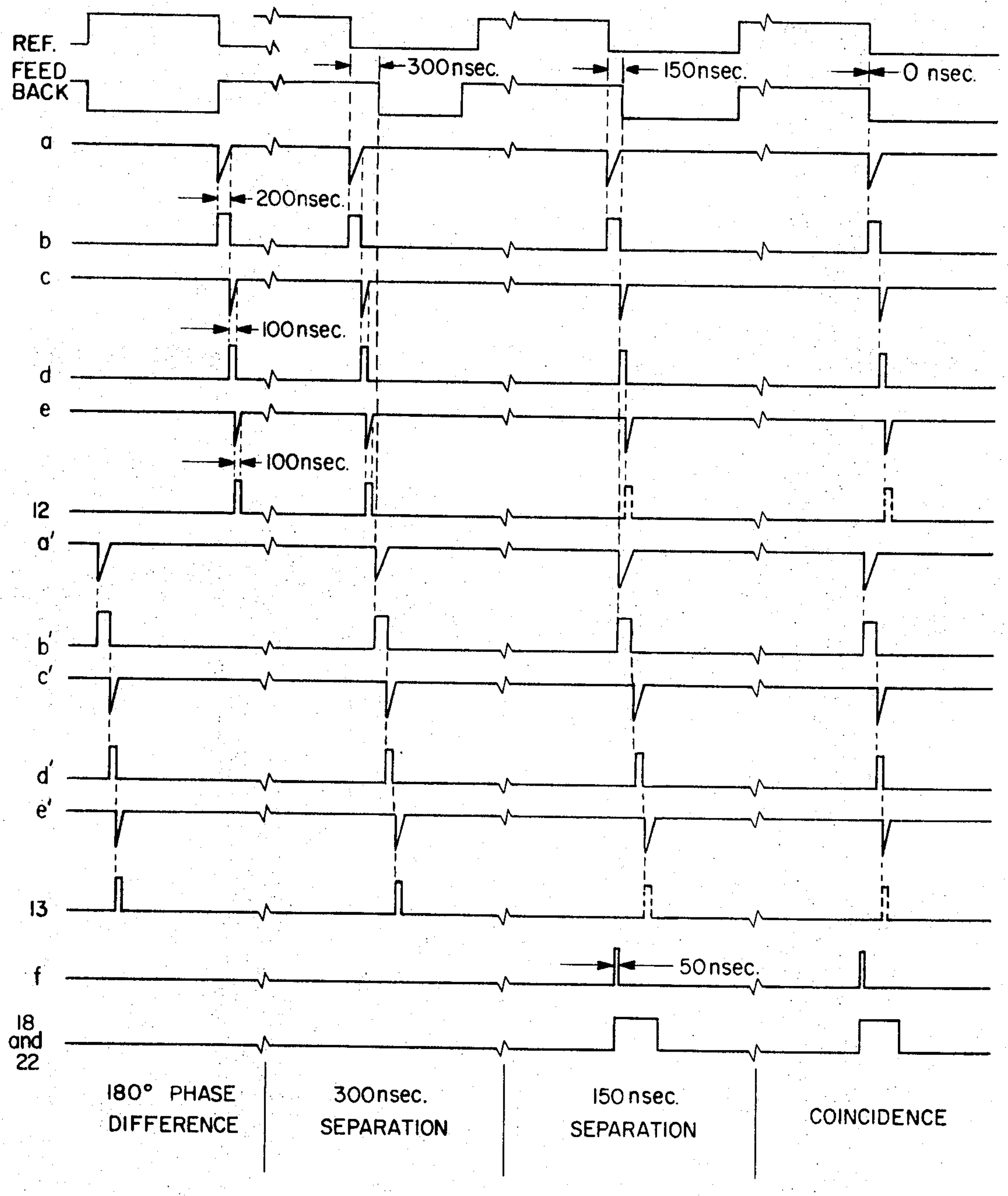
FIG. 4 is a graphical representation of pulses at various stages inthe circuit of FIG. 3.

Still viewing FIGS. 3 and 4, assume that the phase difference between the reference and feedback signals is on the order of 300 nsec. and that the desired $t_2$ is set at 200 nsec. to accommodate a phase comparator having a resolution of 100 nsec. As indicated by the pulse diagrams of FIG. 4, the pulses at junctions *a* and *a'* are theoretically 200 nsec. wide and separated by approximately 300 nsec. Thus, there is no overlap between the pulses and the AND gate 36 is not switched. Accordingly, the AND gates 14 and 15 remain in a transmissive condition and pass the respective reference and feedback pulse trains, though delayed, to the phase comparator.

Now assume, as shown by FIG. 4, that the phase relationship of the reference and feedback pulse trains is in the order of 150 nsec. Under these conditions, there is overlap and the output of AND gate 36 issues a signal in response thereto. A pulse signal of approximately 50 nsec. length appears at the junction *f* since the overlap of the input pulses is approximately 50 nsec. The pulse at

*f* is received by the OR gate 86. The gate 86 provides an output pulse to the capacitor 90 and a negative going pulse is applied to the inverter 88. The time constant of the capacitor 90 and resistor 92 aids in prolonging conduction of the inverter 88. This causes a positive pulse at the output of the inverter 88 which is in turn applied to one input of the OR gate 86, thus keeping the output of the OR gate 86 negative even though *f* may go negative. This condition remains until the resistance-capacitance circuit 90 and 92 times out. Accordingly, a positive stretched-out pulse is received at the terminals 18 and 22 of the AND gates 14 and 15, respectively. It may be noted that by proper selection of the values of capacitor 90 and resistor 92, the pulses at 18 and 22 (see FIG. 4) may also be selective. The timing of the anticoincidence system is so arranged that the two pulses which initiated the AND gate 36 are delayed within the networks 23 and 27 so that they arrive after the terminals 18 and 22 have gone positive or altered from the normal bias condition. Thus, the gates 14 and 15 are switched to a non-transmissive condition and inhibit the 150 nsec separated pulse trains from passing to the digital phase comparator 4.

FIG. 4 also illustrates the signal wave forms and conditions when the reference and feedback pulse trains are in direct phase coincidence. It may be noted that under these conditions the terminals 18 and 22 of the AND gates 14 and 15, respectively, are biased to block the passage of the respective pulse trains.

The preferred embodiment of the network of FIG. 3 include multiple stages of single-shot multivibrators in each delay network 23 and 27. It has been discovered that with a single stage, edge conditions become pertinent, i.e., a leading edge of the delayed pulse could be received and passed through the AND gates 14 or 15 before the control pulse from the inverter 88 is received to bias the AND gates 14 and 15 to a non-transmissive state.

Though the discussion has centered about single-shot delays, AND logic circuits, etc., those skilled in the art will recognize that various other arrangements may be incoporated to practice the teachings of the present invention.

I claim:

1. In a servo system having a digital phase comparator responsive to a train of reference pulses and a train of feedback pulses to urge the servo toward a desired operating point in accordance with the phase relationship therebetween and having an anticoincident circuit conducting the reference pulses and feedback pulses to said comparator, said anticoincident circuit comprising;

first input means for receiving said train of reference pulses;

second input means for receiving said train of feedback pulses;

a first normally transmissive output gate having an output adapted to be connected to said comparator and having a pair of inputs;

a second normally transmissive output gate having an output adapted to be connected to said comparator and having a pair of inputs;

a first delay network connected between said input means in one of said inputs of said first output gate, said delay network comprising a plurality of serially cascaded single-shot multivibrators selected to provide a delay greater than the timewidth of individual said reference and feedback pulses;

a second delay network connected between said second input means and one of said inputs of said second output gate, said second delay network comprising a plurality of serially cascaded single-shot multivibrators selected to provide a delay greater than the timewidth of individual said reference and feedback pulses;

an AND gates having separate inputs individually connected to said first and second input means and having an output issuing a signal in response to time overlapping of said reference and feedback pulses; and a pulse stretching circuit means having a resistive-capacitive delay network and being connected between the output of said AND gate and a junction jointly connecting the remaining inputs of said first and second output gates, said pulse stretching circuit means being responsive to an output signal from said AND gate to drive said first and second output gates to a non-transmissive condition for a duration at least equal to the minimum time separation between adjacent reference and feedback pulses capable of being resolved by said digital comparator.

References Cited

UNITED STATES PATENTS

| | | | |
|---|---|---|---|
| 3,176,208 | 3/1965 | Gifft | 318—314 |
| 3,327,226 | 6/1967 | Nourney | 328—109 |

STANLEY T. KRAWCZEWICZ, Primary Examiner

U.S. Cl. X.R.

318—134, 314